(12) United States Patent
Kambe et al.

(10) Patent No.: US 6,444,357 B1
(45) Date of Patent: Sep. 3, 2002

(54) NON-AQUEOUS ELECTROLYTE SECONDARY BATTERY

(75) Inventors: Chika Kambe; Kouichi Zama, both of Tokyo (JP)

(73) Assignee: NEC TOKIN Corporation (JP)

(*) Notice: Subject to any disclaimer, the term of this patent is extended or adjusted under 35 U.S.C. 154(b) by 0 days.

(21) Appl. No.: 09/572,444

(22) Filed: May 17, 2000

(30) Foreign Application Priority Data

May 19, 1999 (JP) .......................... 11-139189

(51) Int. Cl.[7] .................. H01M 2/02; H01M 6/42

(52) U.S. Cl. ...................... 429/149; 429/169

(58) Field of Search ................ 429/140, 149, 429/156, 157, 169

(56) References Cited

U.S. PATENT DOCUMENTS 4,020,248 A * 4/1977 Goebel .................. 429/164
5,547,780 A * 8/1996 Kagawa et al. .......... 429/149

FOREIGN PATENT DOCUMENTS

| DE | 2 243 187 | 3/1973 | .......... H01M/13/00 |
| JP | 8-153515 | 6/1996 | ............ H01M/4/02 |
| JP | 9-298057 | 11/1997 | ............ H01M/4/02 |

* cited by examiner

Primary Examiner—Stephen Kalafut
Assistant Examiner—Julian A. Mercado
(74) Attorney, Agent, or Firm—Hayes Soloway, P.C.

(57) ABSTRACT

A plurality of slit-shaped space regions are provided on an anode active material layer on a front surface or a rear surface of an anode sheet so as to reach end planes to make it easy to inject an electrolyte into a scrolled body or a jelly roll of a non-aqueous electrolyte secondary battery through the slit-shaped space regions.

10 Claims, 7 Drawing Sheets

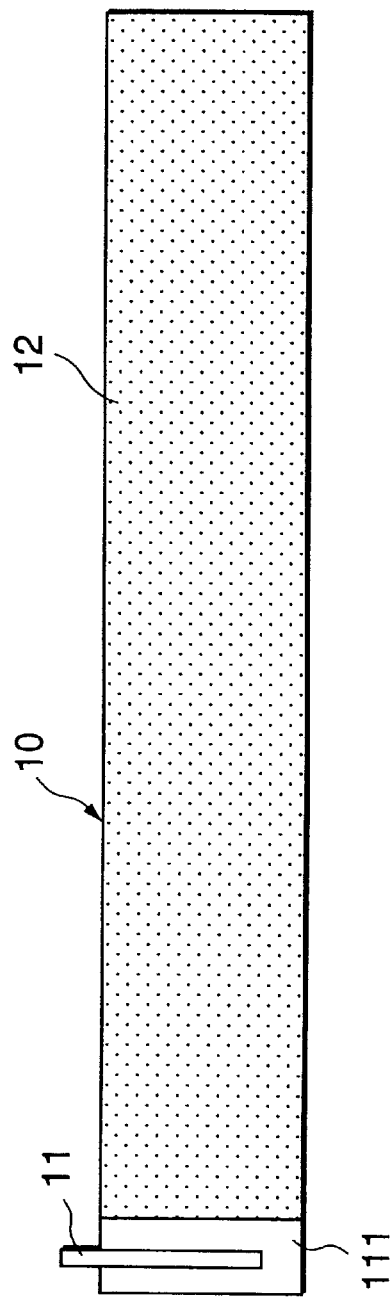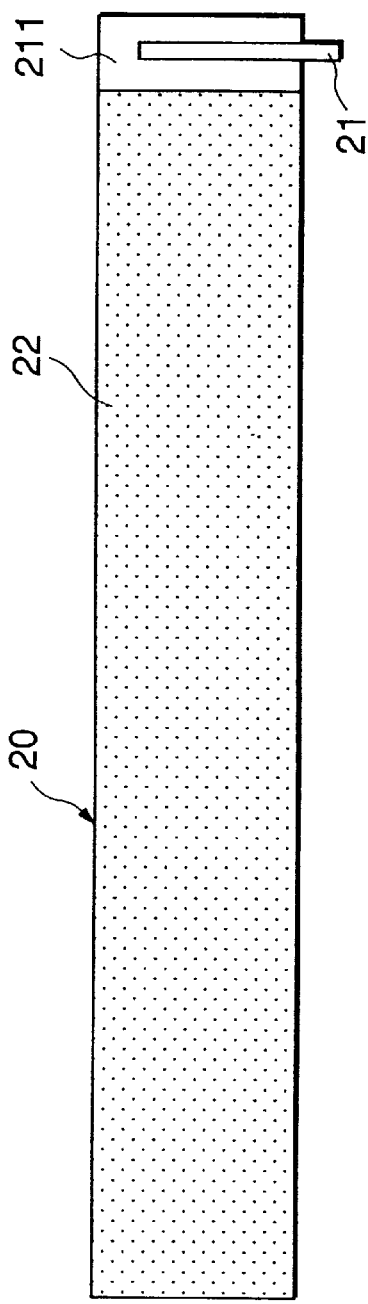
FIG.2A (PRIOR ART)
FIG.2B (PRIOR ART)

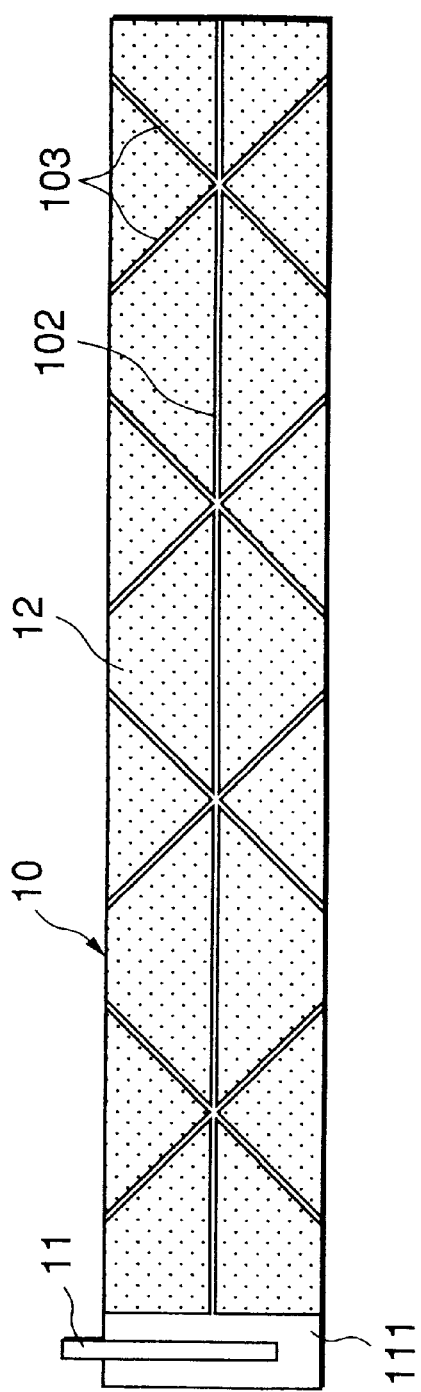
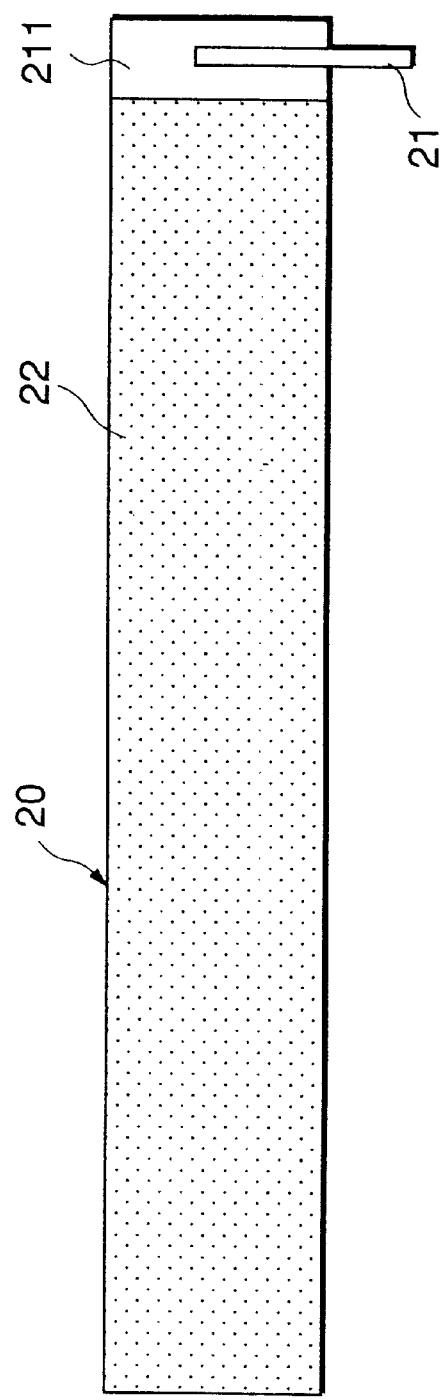
FIG.5A
FIG.5B

NON-AQUEOUS ELECTROLYTE SECONDARY BATTERY

BACKGROUND OF THE INVENTION

1. Field of the Invention

The present invention relates to a non-aqueous electrolyte secondary battery, and in particular to an anode electrode structure of a lithium ion secondary battery.

2. Description of the Prior Art

A lithium ion secondary battery or Li-ion rechargeable battery has many advantages compared with such conventional batteries as nickel-cadmium (Ni—Cd) battery and nickel metal hydyride (Ni—MH) battery.

Firstly, Li-ion battery as the non-aqueous electrolyte secondary battery has a high energy density so that it can work with 20 percent to 50 percent volume of conventional batteries of high-capacity Ni—Cd and Ni—MH despite being of approximately half a mass of those batteries.

Secondly, average voltage quantity of the Li-ion battery can generate a high voltage equivalent to approximately three times the voltage quantity of those of Ni—Cd and Ni—MH batteries.

Owing to above-described advantages, the Li-ion rechargeable battery has become a major and widely used battery type for mobile phones, handheld notebook computer, etc., as a power source.

Referring to FIG. 1, a conventional cylinder-shaped lithium ion secondary battery will be described. A conventional lithium ion secondary battery 1 comprises a cylinder-shaped container 2 housing a scrolled body or a jelly roll of a positive electrode body or an anode sheet 10 and a negative electrode body or cathode sheet 20. A pair of separator sheets 30 is disposed between the anode sheet 10 and the cathode sheet 20 such that the anode sheet 10 and the cathode sheet 20 are electrically insulated. An anode lead (not shown) of the anode sheet 10 disposed at the center of the jelly roll is electrically connected to the anode terminal 3 of the container 2 while a cathode lead 21 welded on the cathode sheet 20 is electrically connected to the negative terminal (not shown) of the container 2. As for the separator 30, a polyethylene micro-porous film is used. The scrolled body (hereinafter referred to as a jelly roll) is impregnated with an electrolyte of non-proton organic solvent in which $LiPF_6$ is dissolved.

Referring to FIG. 2A, the anode sheet 10 is made of an aluminum foil coated with an anode active material layer 12. The aluminum foil is used as an electricity collection body and the active material layer 12 consists of compound metal oxide containing lithium. The active material is coated on front and rear surfaces of the aluminum foil. A blank space 111 is formed at one end of the anode sheet 10 to be welded with an anode lead 11. The anode lead 11 is electrically connected to the anode terminal 3 of the container 2 (see FIG. 1).

Now referring to FIG. 2B, the cathode sheet 20 is made of a copper foil coated with cathode active material 22. The copper foil is used as an electricity collection body. The cathode active material comprises a carbonaceous material capable of doping and undoping of lithium ions. The cathode active material layer 22 is formed on front and rear surfaces of the copper foil. At the end of the cathode sheet 20, a blank space 211 is formed for fixing a cathode lead 21 thereto. The cathode lead 21 is electrically connected to the cathode terminal of the container 2.

In such a jelly roll structure, a step of impregnating the electrolyte into the jelly roll is a time consuming process. This is because the jelly roll is minutely disposed inside the container and thus the electrolyte does not permeate into the jelly roll smoothly. For example, a step of causing an electrolyte impregnating process for a jelly roll having approximate length of 2 m and approximate width of 100 mm of anode and cathode sheets requires time not less than 10 hours.

As a method of solving such a problem, it is proposed to provide a plurality of electrolyte-guiding grooves on a surface of the cathode active material layer coated on a core foil as disclosed in the specification of Japanese Patent Laid-Open No. 9-293057. In this proposed structure, grooves are formed by applying pressure onto a surface of the cathode active material layer with a roller having a plurality of protrusions, so that the electrolyte can be easily introduced into a central region of the cathode active material.

However, by compressing the layer of the cathode active material for forming the electrolyte guiding grooves with a roller, the density of the active material layer is made uneven, which could worsen charge-discharge cycle characteristics as a non-aqueous electrolyte secondary battery.

SUMMARY OF THE INVENTION

Accordingly, an object of the present invention is to provide a non-aqueous electrolyte secondary battery that can reduce an injection time for impregnating an electrolyte into a jelly roll without causing the above mentioned uneven density of the active material layer. In a nonaqueous electrolyte secondary battery according to the present invention, a jelly roll comprises an anode sheet and a cathode sheet with a pair of separator sheets sandwiched therebetween. The anode sheet is coated with a plurality of regions of anode active material separated by a plurality of slit-shaped space regions elongating in a width direction of the anode sheet. The cathode sheet is coated with cathode active material.

The jelly roll is inserted into a battery can or a container having anode and cathode terminals which are electrically connected to the anode and cathode sheets, respectively. An organic non-aqueous electrolyte is injected into the jelly roll within the container such that the anode active material is impregnated with the electrolyte through the slit-shaped space regions.

Both ends of each of the slit-shaped space regions are extended to side edges of the anode sheet to enhance the impregnation process. These space regions are arranged in parallel to each other.

According to other aspect of the present invention, the plurality of regions of anode active material are further divided by an additional slit-shaped space region elongating in a longitudinal direction of the anode sheet so as to make a space network pattern by coupling the plurality of slit-shaped space regions to each other.

As for the space network pattern, other modification patterns may be used such that each of the slit-shaped space regions is disposed so as to intersect in a letter X, and is coupled to the above additional slit-shaped space region.

Each of the slit-shaped space regions may have such pattern that a central portion of each of the slit-shaped space regions is wider than those of end portion thereof.

Furthermore, each of the slit-shaped space regions may be disposed so that the adjacent distance becomes narrower toward the center of the jelly roll to equally enhance the impregnation process for entire region of the jelly roll.

Needless to say, the plurality regions of anode active material are formed on both surfaces of the anode sheet with the slit-shaped space regions.

It is preferable to set the total area occupied by the slit-shaped space regions to be less than 2 percent and not less than 0.5 percent of a total area of the anode active material.

It is also preferable to set the width of each of the slit-shaped space regions to be within a range of approximately 0.1 percent to 1.5 percent of width of the anode sheet.

BRIEF DESCRIPTION OF THE DRAWINGS

The above-mentioned and other objects, features and advantages of this invention will become more apparent by reference to the following detailed description of the invention taken in conjunction with the accompanying drawings, wherein:

FIG. 2A is a plan view showing a configuration of an anode sheet of a conventional non-aqueous electrolyte secondary battery;

FIG. 2B is a plan view showing a configuration of a cathode sheet of a conventional non-aqueous electrolyte secondary battery;

FIG. 5A is a plan view showing a configuration of an anode sheet of a non-aqueous electrolyte secondary battery related to the third embodiment of the present invention;

FIG. 5B is a plan view showing a configuration of a cathode sheet of a non-aqueous electrolyte secondary battery related to the third embodiment of the present invention;

DETAILED DESCRIPTION OF THE PREFERRED EMBODIMENTS

Figure 3A:
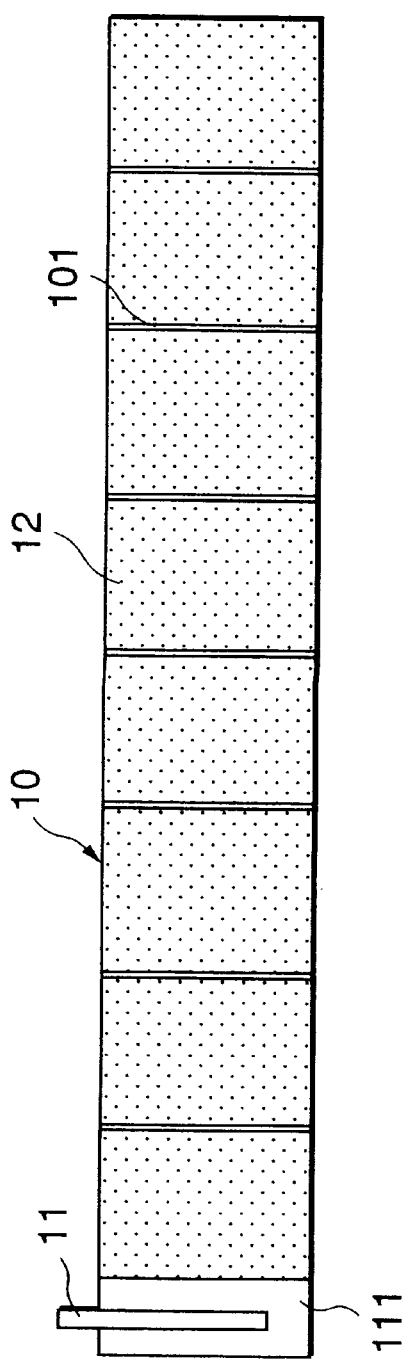
FIG. 3A is a plan view showing a configuration of an anode sheet of a non-aqueous electrolyte secondary battery related to the first embodiment of the present invention.

Referring to FIG. 3A, an anode sheet 10 comprises a belt-shaped aluminum foil coated with anode active material 12, which is divided into a plurality of regions by a plurality of non-coated portions of slit-shaped space regions 101. Needless to say, the rear surface of the aluminum foil is also coated with the same anode active material and provided with the same slit-shaped space regions. The slit-shaped space regions 101 are shown extending in a width direction of the anode sheet 10. At the end portion of the anode sheet 10, a blank space region 111 is provided where an aluminum foil is exposed so that an anode lead 11 is welded thereon. Each of the slit-shaped space regions 101 is an elongated area where the aluminum foil is exposed. In the shown example, the numbers of the slit-shaped space regions 101 are seven so as to equally divide the active material into eight regions. The ends of each slit-shaped space region 101 are extended so as to reach both side edges of the aluminum foil so that an electrolyte can be easily impregnated through the slit-shaped space regions after winding.

As for a forming method of a plurality of anode active material region on the aluminum foil, an intermittent method can be used in which a slurry of the anode active material is intermittently supplied on the foil by using a so called doctor blade method. Other methods such as a liftoff method also can be used in which a plurality of strips of masking tape are fixed on the foil prior to the coating step of the active material slurry, and after the active material is coated, the masking tape strips are peeled off from the foil. Furthermore, a selective coating method such as a screen-printing method may be used for forming a plurality of anode active material regions separated by a plurality of slit-shaped space regions.

According the present invention, since the slit-shaped space regions 101 are formed without pressing process as in the case of the above-described prior art, charge-discharge cycle characteristics is not made worse.

Figure 3B:
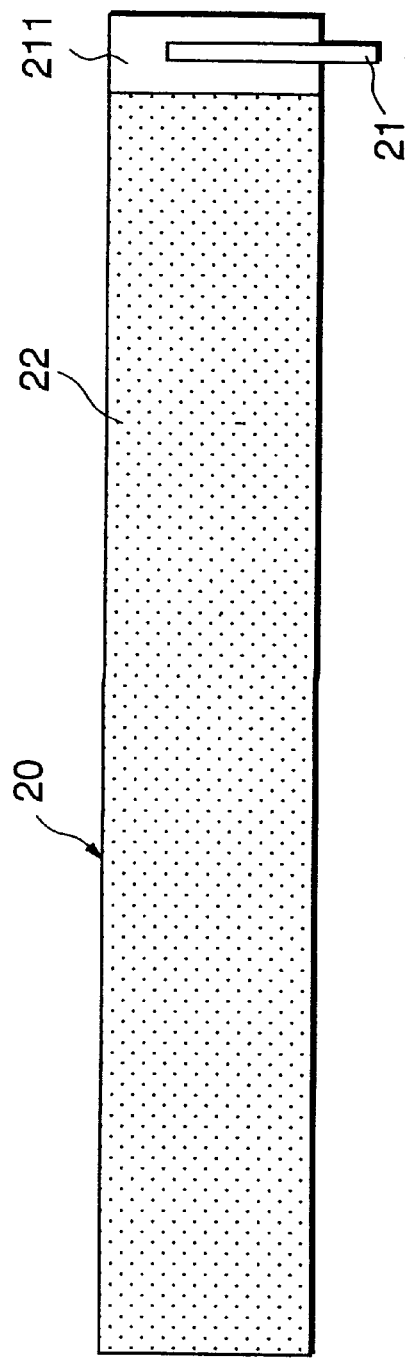
FIG. 3B is a plan view showing a configuration of a cathode sheet of a non-aqueous electrolyte secondary battery related to the first embodiment of the present invention.

Referring to FIG. 3B, a cathode sheet 20 has the same structure of the prior art cathode sheet shown in FIG. 2B.

Figure 1:
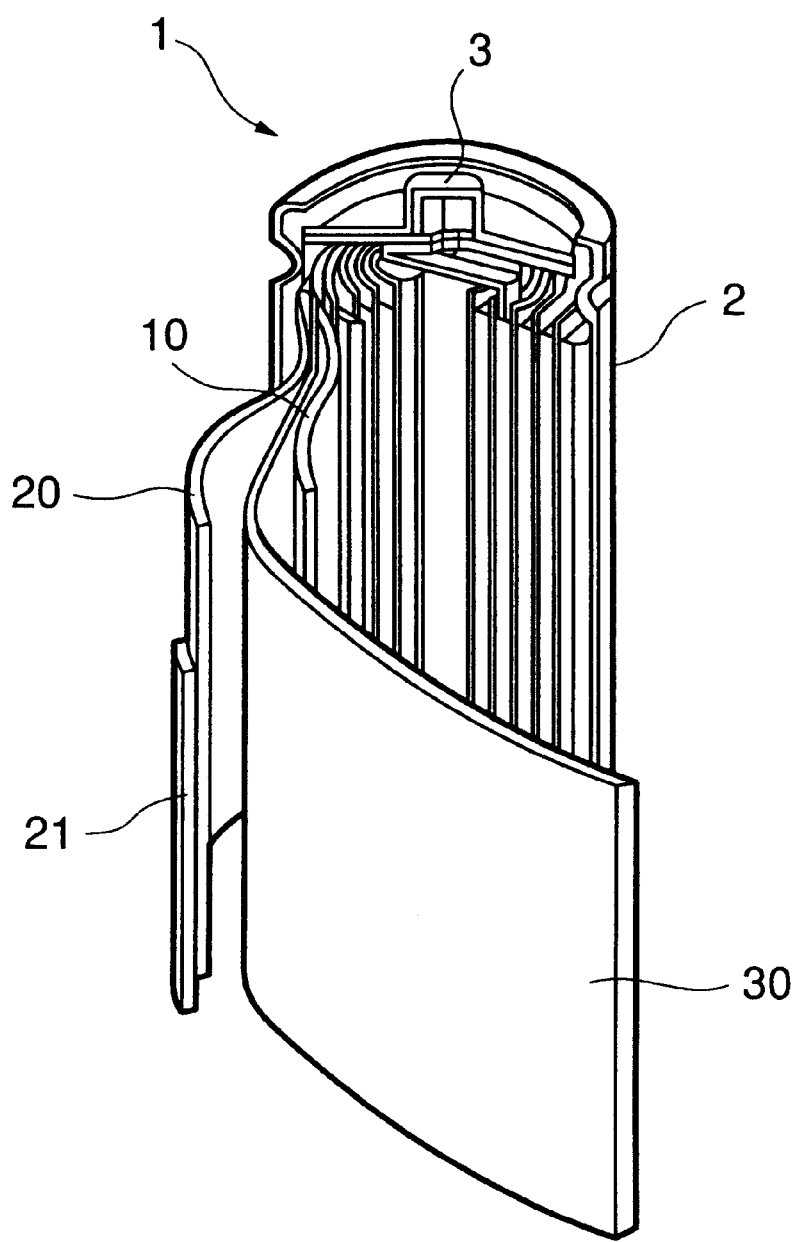
FIG. 1 is a perspective view in a broken fashion and showing a configuration of a conventional non-aqueous electrolyte secondary battery.

A scrolled body or a jelly roll as shown in FIG. 1 is created by spirally winding the above described anode sheet 10, the cathode sheet 20, and two separators 30. The jelly roll is then inserted into a conventional battery can or container, and the electrolyte is poured into the container so that the active material of the jelly roll is impregnated with the electrolyte. In the same manner of the conventional one, anode and cathode leads of the jelly roll are electrically connected to anode and cathode terminals of the cylindrical container, respectively. The electrolyte is a solvent in which propylene carbonate (hereinafter to be referred to as PC) and diethyl carbonate (hereinafter to be referred to as DEC) are mixed at a volume ratio of 1:1 with one mol of $LiPF_6$ as supporting halide.

(Embodiment 1)

Now the first embodiment of a non-aqueous electrolyte secondary battery according to the present invention will be described with reference to FIG. 3A and FIG. 3B.

Firstly, $LiMn_2O_4$ as a main component of the anode active material layer 12 and carbon black as a conductivity-giving agent are mixed together through a dry blending process. Next, this mixture is dispersed in a homogeneous fashion in N-methyl-2-pyrolidone (hereinafter to be referred to as NMP), in which polyvinylidene fluoride (hereinafter to be referred to as PVDF) as a binder for $LiMn_2O_4$ and the carbon black is dissolved so that a slurry-type anode active material is produced.

Next, an aluminum foil provided with a plurality of masking apes corresponding to a region of line-shaped non-coating portion or slit-shaped space regions 101 in FIG. 3A is coated with slurry-type anode active material by using a doctor blade method, and NMP is evaporated from the anode sheet 10. Weight ratio of a solid portion contained in the resulted anode active material is set to be $LiMn_2O_4$: conductivity giving agent: PVDF=8:1:1. Thereafter, the masking tapes on the front and the rear surface of the anode sheet 10 are stripped off so as to form the slit-shaped space regions 101. Since the pattern for the rear surface of the non-coating portion of the slit-shaped space regions 10 is the same as in the front surface thereof, a drawing for the rear surface of the anode sheet 10 is omitted. In the first embodiment, as shown in FIG. 3A, the positions of the slit-shaped space regions 101 are formed such that the anode active material layer 12 is divided into eight parts in the longitudinal direction. The aluminum foil has sizes of 2-m length, 150-mm width, and 20-pm thickness, and thickness of coating porting of the anode active material layer 12 is set to be 2 mm. Each of the slit-shaped space regions has 2-mm width.

As for the cathode sheet 20, carbon and PVDF are mixed to have a weight ratio of carbon: PVDF-=9:1, and then dispersed in NMP to form a cathode active material 22 to be coated onto a copper foil with 20-$\mu$m thickness. The carbon in the cathode active material can dope or undope lithium ions.

The anode sheet 10 and the cathode sheet 20 are laminated together with a pair of separators 30 (see FIG. 1) of polyethylene porous film having 25 $\mu$m width, and are rolled up, and housed within a container, and an electrolyte is poured into the container to produce a non-aqueous electrolyte secondary battery. The width of the separators is selected to be wider than those of the copper foil and the aluminum foil.

The electrolyte is obtained as a solvent in which PC and DEC are mixed at a volume ratio of 1:1 with 1 mol/1 of $lipf_6$ as supporting halide.

COMPARATIVE EXAMPLE 1

The first comparable example has an anode sheet 10 shown in FIG. 2 wherein no slit-shaped space regions are provided. Other manufacturing conditions are the same as the first embodiment.

Both batteries according to this comparative example and the first embodiment are compared as follows.

In three minutes after the electrolyte is poured into a battery can, the batteries are disassembled for comparing impregnation ratio of electrolyte in an electrode area, the ratio for the comparative example is 25 percent while that for the first embodiment is 100 percent.

(Embodiment 2)

Figure 4A:
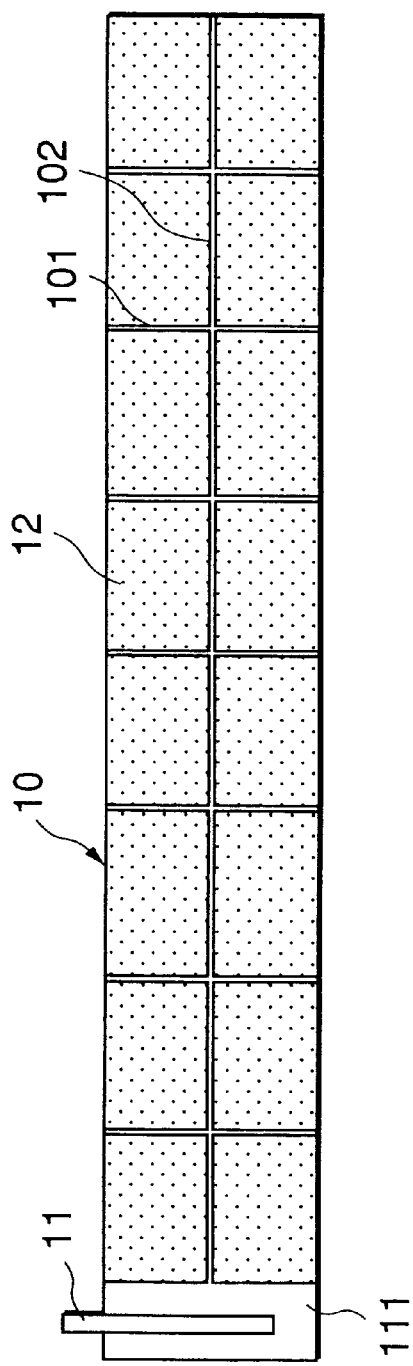
FIG. 4A is a plan view showing a configuration of an anode sheet of a non-aqueous electrolyte secondary battery related to the second embodiment of the present invention.
Figure 4B:
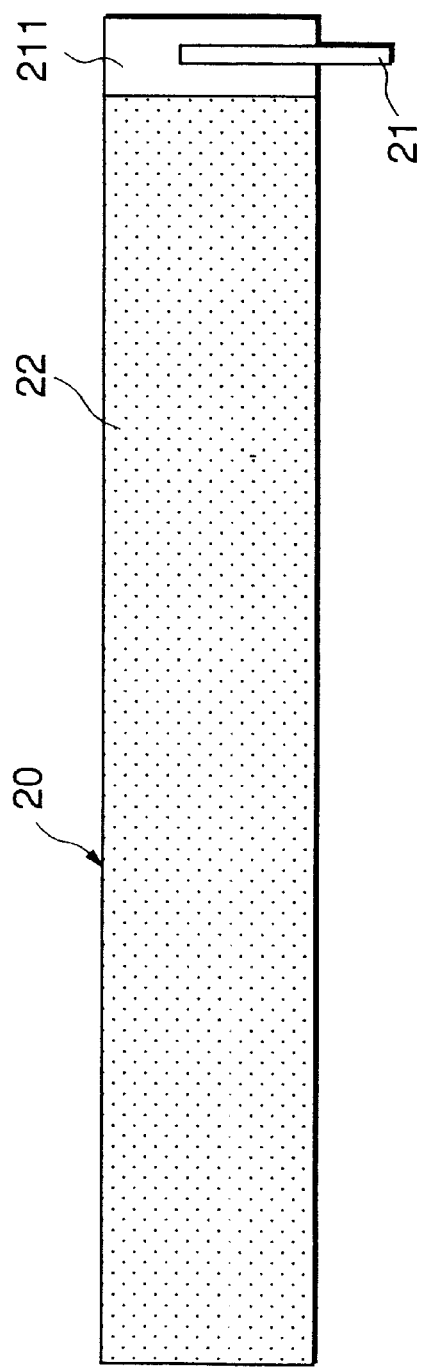
FIG. 4B is a plan view showing a configuration of a cathode sheet of a non-aqueous electrolyte secondary battery related to the second embodiment of the present invention.

Referring to FIG. 4A and FIG. 4B, the anode sheet 10 and the cathode sheet 20 are formed with the same materials and sizes as the above described first embodiment. As shown in FIG. 4A, in addition to a plurality of slit-shaped space regions 101 extended in the direction of width of the positive electrode body 10, a single line-shaped space region 102 is formed along the longitudinal direction at the center of the belt-shaped aluminum foil so as to make a space network pattern by coupling the plurality of slit-shaped space regions to each other. That is, in the first embodiment, the active material layer on one surface of the positive electrode body is equally divided into eight parts, but in the second embodiment, the layer is equally divided into 16 parts. This slit-shaped space region 102 has 2-mm width, and the both ends thereof reach at ends of the anode active material layer 12 so as to make an electrolyte injection easy. This slit-shaped space region 102 is extended so as to cross a plurality of the slit-shaped space regions 101 in the width directions, and therefore the electrolyte impregnated from the both surfaces of the jelly roll can swiftly reach the region of central portion of the anode active material layer.

The cathode sheet 20 has the same structure of the first embodiment as shown in FIG. 4B.

These are laminated together with two separators in the same manner as described in the first to produce a cylindrical battery.

COMPARATIVE EXAMPLE 2

The non-aqueous electrolyte secondary battery obtained in the second embodiment of the present invention is compared with the above-described comparative example.

In two minutes after the electrolyte is injected, the batteries are disassembled for comparing impregnation ratio of electrolyte in an electrode area. The ratio for the comparable example is 20 percent while that for the second embodiment of the present application is 100 percent.

(Embodiment 3)

Referring to FIG. 5A and FIG. 5B, the third embodiment of the present invention will be described as follows. Also for the present embodiment, except for the pattern shape of the slit-shaped space regions, other manufacturing conditions are the same as those for the first embodiment. In the present embodiment, as shown in FIG. 5A, a slit-shaped space region 102 with 2-mm width is provided at the middle in the longitudinal direction of the anode sheet 10, and four X-shaped slit-shaped space regions 103 with 2-mm width are provided at intervals of 40 cm on the front surface as well as the rear surface of the anode sheet 10. Accordingly, in the present embodiment, the active material layer on one surface of the anode sheet is equally divided into 18 parts. As for the cathode sheet 20, the same structure is used as in the case of the first embodiment. Then a cylindrical battery is produced in the same manner of the first embodiment by using these sheets together with a pair of separators.

COMPARATIVE EXAMPLE 3

The non-aqueous electrolyte secondary battery according to the third embodiment is compared with the above-described comparative example.

In one minute after the electrolyte is injected, the batteries are disassembled for comparing impregnation ratio of electrolyte in an electrode area. The ratio for the comparative example is 15 percent while that for the third embodiment of the present invention is 100 percent.

In the foregoing description, the same pattern of the slit-shaped space regions are provided on the front and rear surfaces of the anode sheet, but needless to say, that the slit-shaped space regions are not necessarily the same, but may be different.

Other modification can be applied to the foregoing embodiments. In the embodiment shown in FIG. 4A, for example, the both ends of the slit-shaped space region 102 may be terminated within the anode active material layer 12, rather than reaching to the both ends so as to completely separate it into top and bottom regions. In such a case, since the adjacent slit-shaped space regions 101 are connected to each other, impregnation speed can be improved compared with the first embodiment.

Figure 6:
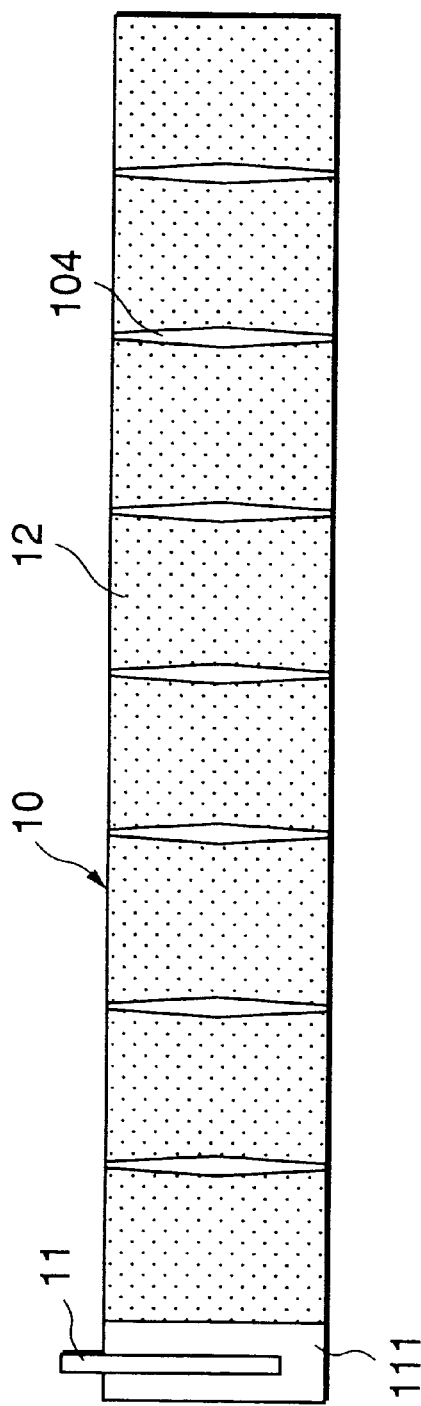
FIG. 6 is a plan view showing a configuration of an anode sheet of a non-aqueous electrolyte secondary battery related to variation of the present invention.
Figure 7:
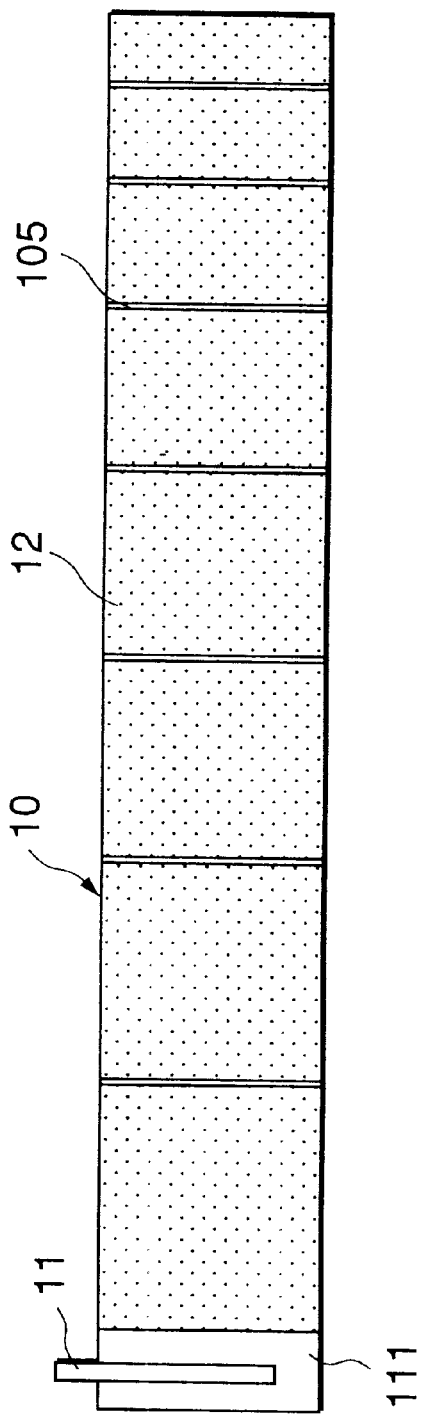
FIG. 7 is a plan view showing a configuration of an anode sheet of a non-aqueous electrolyte secondary battery related to variation of the present invention.

As for a variation of the slit-shaped space regions 101 in FIG. 3A, its center width may be made wider than end widths. Such structure is shown in FIG. 6, where an electrolyte can be injected to the center of the battery through the slit-shaped space regions 104 to achieve swift impregnation.

Figure 3C:
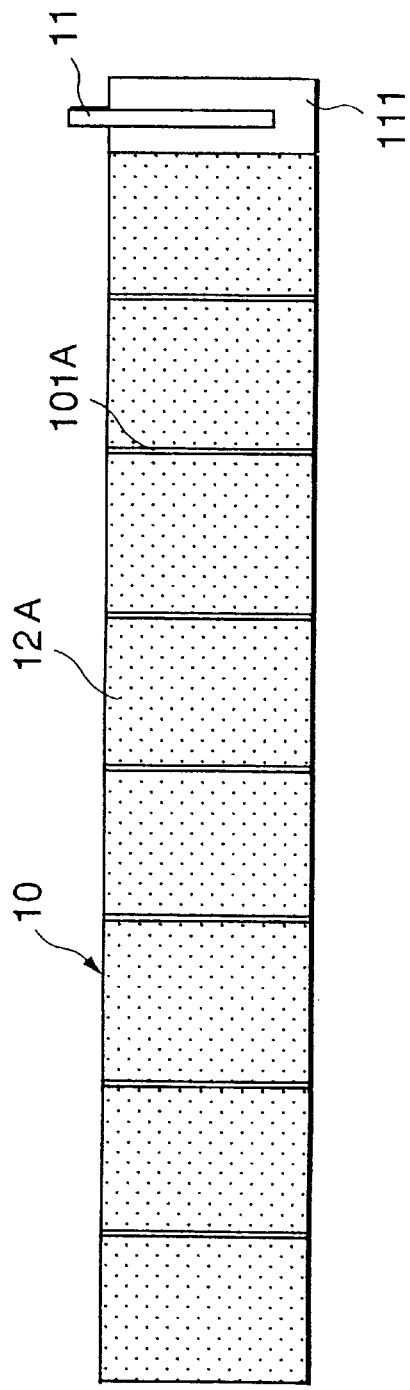
FIG. 3C is a view similar to FIG. 3A, of the opposite side of an anode sheet in accordance with an alternative embodiment of the present invention.

Another modification is shown in FIG. 3C, wherein the back surfaces of the anode sheet are coated with regions 12A of anode active material divided by slit-shaped space regions 101A.

Alternative means to achieve a homogeneous implement for the entire battery, the width of the slit-shaped space regions may be gradually changed such that the widths of the space regions located close to the wound center of the jelly roll is made wider than those located outer portion.

According to the present invention, the total area of the slit-shaped space regions is selected to be less than two percent and not less than 0.5 percent of the coating area of the anode active material layer 12.

With the area occupied by the slit-shaped space regions being less than 2 percent of the active material, it is possible to cause an electrolyte to effectively impregnate into the anode active material to improve charge-discharge cycle characteristics without causing problems such as capacity shortage. However, with a ratio of less than 0.5 percent, the electrolyte can no longer effectuate to shorten the impregnation step, and therefore the lowest ratio is preferably not less than 0.5 percent.

From the view point of width of the slit-shaped space regions, its width is preferably set within an approximate range of 0.1 percent to 1.5 percent of the anode sheet 10 to prevent impedance from decreasing and prevent a battery capacity as well as its cycle characteristics from being lowered.

As described above, the configuration of the non-aqueous electrolyte secondary battery according to the present invention can impregnate an electrolyte into a jelly roll faster compared with the case where a conventional jelly roll is used. In addition, since the slit-shaped space regions are provided only for the anode sheet, a conventional manufacturing step can be adopted. That is, while a producing step similar to a conventional case is maintained, a period for producing step can be shortened and the yield factor of products is improved. Furthermore, since the slit-shaped space regions are formed without pressing process, a charge-discharge cycle characteristic is not made worse.

What is claimed is:

1. A non-aqueous electrolyte secondary battery comprising:

a scrolled body of an anode sheet and a cathode sheet with a pair of separator sheets sandwiched therebetween, said anode sheet being coated with a plurality of regions of anode active material separated by a plurality of slit-shaped space regions elongating in a width direction of said anode sheet, wherein each of said slit-shaped space regions is disposed so that an adjacent distance becomes narrower towards a center of said scrolled body, said cathode sheet being coated with cathode active material;

a container housing said scrolled body and having anode and cathode terminals electrically connected to said anode and cathode sheets, respectively; and an organic non-aqueous electrolyte filling said scrolled body within said container such that said anode active materials are impregnated with said electrolyte through said slit-shaped space regions.

2. The non-aqueous electrolyte secondary battery according to claim 1, wherein an end of each of said slit-shaped space regions extends to side edges of said anode sheet.

3. The non-aqueous electrolyte secondary battery according to claim 2, wherein said plurality of regions of anode active material are further divided by an additional slit-shaped space region elongating in a longitudinal direction of said anode sheet so as to make a space network pattern by coupling said plurality of slit-shaped space regions to each other.

4. The non-aqueous electrolyte secondary battery according to claim 3, wherein each of said slit-shaped space regions is disposed so as to intersect in a letter X, and is coupled to said additional slit-shaped space region.

5. The non-aqueous electrolyte secondary battery according to claim 2, wherein each of said slit-shaped space regions is disposed in parallel to each other.

6. The non-aqueous electrolyte secondary battery according to claim 1, wherein a central portion of each of said slit-shaped space regions is wider than those of an end portion thereof.

7. The non-aqueous electrolyte secondary battery according to claim 1, wherein opposing surfaces of said anode sheet are coated with a plurality of opposing regions of anode active material separated by slit-shaped space regions.

8. The non-aqueous electrolyte secondary battery according to claim 1, wherein an area occupied by said slip-shaped space regions is less than 2 percent and not less than 0.5 percent of a total area of said anode active material.

9. The non-aqueous electrolyte secondary battery according to claim 1, wherein a width of each of said slit-shaped space region is set within a range of approximately 0.1 percent to 1.5 percent of a width of said anode sheet.

10. The non-aqueous electrolyte secondary battery according to claim 1, wherein an anode lead is connected to said anode sheet for electrical connection to said anode terminal, and a cathode lead is connected to said cathode sheet for electrical connection to said cathode terminal.

* * * * *